US012626688B2

(12) United States Patent
Kim et al.

(10) Patent No.: US 12,626,688 B2
(45) Date of Patent: May 12, 2026

(54) METHOD AND SYSTEM FOR SPEECH DETECTION AND SPEECH ENHANCEMENT

(71) Applicant: PEXIP AS, Oslo (NO)

(72) Inventors: Anna Kim, Asker (NO); Eamonn Shaw, Gamle Fredrikstad (NO)

(73) Assignee: PEXIP AS, Oslo (NO)

( * ) Notice: Subject to any disclaimer, the term of this patent is extended or adjusted under 35 U.S.C. 154(b) by 319 days.

(21) Appl. No.: 17/852,548

(22) Filed: Jun. 29, 2022

(65) Prior Publication Data

US 2023/0005469 A1     Jan. 5, 2023

(30) Foreign Application Priority Data

Jun. 30, 2021    (NO) .................................... 20210874

(51) Int. Cl.
*G10L 15/02*        (2006.01)
*G10L 15/06*        (2013.01)
(Continued)

(52) U.S. Cl.
CPC ............ *G10L 15/063* (2013.01); *G10L 15/02* (2013.01); *G10L 21/0224* (2013.01);
(Continued)

(58) Field of Classification Search
CPC ................... G10L 15/063; G10L 15/02; G10L 21/0224; G10L 21/0232; G10L 25/57; G10L 25/84; G10L 25/30; G10L 15/00
See application file for complete search history.

(56) References Cited

U.S. PATENT DOCUMENTS

| | | | |
|---|---|---|---|
| 2013/0022223 A1 | 1/2013 | Kehtarnavaz | |
| 2013/0262128 A1* | 10/2013 | Teutsch .............. | G10L 21/0364 |
| | | | 704/500 |

(Continued)

FOREIGN PATENT DOCUMENTS

| | | |
|---|---|---|
| CN | 111613243 A | 9/2020 |
| CN | 112581973 A | 3/2021 |

(Continued)

OTHER PUBLICATIONS

G. Kim and P. C. Loizou, "Improving Speech Intelligibility in Noise Using Environment-Optimized Algorithms," in IEEE Transactions on Audio, Speech, and Language Processing, vol. 18, No. 8, pp. 2080-2090, Nov. 2010, doi: 10.1109/TASL.2010.2041116. (Year: 2010).*

(Continued)

*Primary Examiner* — Daniel C Washburn
*Assistant Examiner* — Penny L Caudle
(74) *Attorney, Agent, or Firm* — Leech Tishman Fuscaldo & Lampl, LLC

(57)        ABSTRACT

A method of speech detection, speech enhancement, and training in a speech detection and speech enhancement unit. The method comprising receiving input audio segments, and determining an acoustic environment based on input audio auxiliary information, extracting T-F-domain features from the received input audio segments, determining if each of the received input audio segments is speech by inputting the T-F domain features into a speech detection classifier trained for the determined acoustic environment, determining, when one of the received input audio segments is speech, if the received audio segment is noisy speech by inputting the T-F domain features into a noise classifier using a statistical generative model representing the probability distributions of the T-F domain features of noisy speech trained for the (Continued)

determined acoustic environment, and applying a noise reduction mask on the received input audio segments according to the determination of the received audio segment is noisy speech.

5 Claims, 3 Drawing Sheets

(51) Int. Cl.
|  |  |
|---|---|
| *G10L 21/0224* | (2013.01) |
| *G10L 21/0232* | (2013.01) |
| *G10L 25/57* | (2013.01) |
| *G10L 25/84* | (2013.01) |

(52) U.S. Cl.
CPC .......... *G10L 21/0232* (2013.01); *G10L 25/57* (2013.01); *G10L 25/84* (2013.01)

(56) References Cited

U.S. PATENT DOCUMENTS

| | | | |
|---|---|---|---|
| 2014/0278415 A1* | 9/2014 | Ivanov | G10L 15/22 |
| | | | 704/246 |
| 2019/0172476 A1 | 6/2019 | Wung et al. | |
| 2020/0184987 A1 | 6/2020 | Kupryjanow et al. | |
| 2021/0074282 A1 | 3/2021 | Borgstrom | |

FOREIGN PATENT DOCUMENTS

| | | | | |
|---|---|---|---|---|
| CN | 111933175 B | * | 10/2023 | ......... G06F 18/2321 |
| WO | 2017119901 A1 | | 7/2017 | |

OTHER PUBLICATIONS

V. Peltonen, J. Tuomi, A. Klapuri, J. Huopaniemi and T. Sorsa, "Computational auditory scene recognition," 2002 IEEE International Conference on Acoustics, Speech, and Signal Processing, Orlando, FL, USA, 2002, pp. II-1941-II-1944, doi: 10.1109/ICASSP. 2002.5745009. (Year: 2002).*

Norwegian Industrial Property Office, Norwegian Search Report for corresponding Norwegian Application No. 20210874, dated Jan. 28, 2022, 2 pages.

European Patent Office, International-Type Search Report, for corresponding Norwegian Application No. 20210874, dated Aug. 10, 2021, 11 pages.

Bao Feng et al., Signal Power Estimation Based on Convex Optimization for Speech Enhancement, 2017 Asia-Pacific Signal and Information Processing Association Annual Summit and Conference (APSIPA ASC), IEEE, Dec. 12, 2017, pp. 483-487, XP 033315466.

Zhao Xiaojia et al., Robust Speaker Identification in Noisy and Reverberant Conditions, IEEE/ACM Transaction on Audio, Speech, and Language Processing, IEEE, USA, vol. 22, No. 4, Apr. 1, 2014, pp. 836-845, XP011542426.

* cited by examiner

METHOD AND SYSTEM FOR SPEECH DETECTION AND SPEECH ENHANCEMENT

CROSS-REFERENCE TO RELATED APPLICATION

This application is related to and claimed priority to Norwegian Patent Application No. 20210874, filed Jun. 30, 2021, entitled METHOD AND SYSTEM FOR SPEECH DETECTION AND SPEECH ENHANCEMENT, the entirety of which is incorporated herein by reference.

FIELD

The present invention relates to detecting and enhancing speech in a multipoint videoconferencing session, in particular a method of speech detection and speech enhancement in a speech detection and speech enhancement unit of Multipoint Conferencing Node (MCN) and a method of training the same.

BACKGROUND

Transmission of audio and moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most common used term, and has traditionally has been associated with hardware dedicated to the purpose, however, the functions of an MCN could just as well be implemented in software installed on general purpose severs and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

Audio quality represents a key aspect of the video conferencing experience. One major challenge is the heterogeneous and dynamic nature of the audio environment of the various conference participants. In a home office, some participants may use headsets with directional microphones that are closed to the mouth, while others may use the built-in speaker and microphone on a laptop computer. In a typical meeting room that is equipped with a video conferencing endpoint, a speaker with multiple microphones is often placed in the middle of the table, where participants are sitting at different distances to the shared audio unit. There may also be participants who are connected to the conference via a smartphone that is either handheld or using an external headset with microphone. These diverse physical setups mean that different types of noise may be picked up during the course of the conference. Relying on the user to constantly or consciously mute and unmute the microphone can be cumbersome and tiring, while disrupting the flow of the conversation.

Effectively reducing the impact of noise in a video conference setting is a challenging problem. Depending on the source and the environment, the noise contributions may be stationary or non-stationary, bursty, narrow or wideband, or contain speech-like harmonics. One challenge is to reduce or eliminate noises that are disturbances in the meeting. Some noise can be minimized by audio devices on the client side which have active background noise cancellation. Non-verbal sounds produced by the speaker, such as coughing, sneezing and heavy breathing are generally undesirable but can't be removed in the same manner. Means to differentiate speech from noise, i.e. reliable speech detection, is therefore needed. In addition, speech corrupted by noise becomes less intelligible. The extent of degradation depends on the amount and the type of noise contributions. How to enhance the quality and intelligibility of speech when noise is present is the other challenge to be addressed.

Known solutions a for speech detection, also known as voice activity detection (VAD), and speech enhancement are typically implemented on the client side, i.e. where speech is generated or perceived. The GSM standard features audio codecs that support VAD for better bandwidth utilization. Various enhancement algorithms implementations can be found in various high performance headsets.

Recent advances in machine learning also lead to a large number of deep learning neural network (DNN) based speech processing algorithms. The Opus audio codec for example improves VAD and supports classification of speech and music using RNN (recurrent neural networks) in its Opus 1.3 release. Microsoft have also been actively pursuing real-time de-noising of speech using neural networks (venturebeat.com/2020/04/09/microsoft-teams-ai-machine-learning-real-time-noise-suppression-typing/) implemented on the client side. Virtual microphone and speaker systems, such as Nvidia RTX voice noise cancellation plugin and Krisp, can be installed on a computer and be used in conjunction with conferencing and streaming services to improve audio quality, handling both inbound (speaker) and outbound (microphone) noises.

Due to the size of the resulting DNN models, which is required to cover a large set of noise types (>100), latency is always a challenge for deployment in real-time interactive applications. The large computation resources demanded for inference means scalability is an issue in video conferences, as it cannot be simply offloaded to the cloud, which would induce added cost of communication bandwidth and delay, resulting in client side implementations as discussed above.

There are, however, clear benefits for server side media handling in video conferencing. As illustrated in FIG. 1, audio and video streams from conference participants are received and processed in parallel in the Multipoint Conferencing Node (MCN). Such an architecture may ensure end-to-end quality-of-service, balance network loads, and provide advanced processing and services. Speech detection and enhancement done in the MCN would provide the participants with better audio quality irrespective of the client-side implementation. The user is completely freed of the burden to decide if inbound or outbound noise reduction is needed.

Therefore, there is a need for as system and method of a server side speech detection and enhancement method that is scalable to support a varying number of participants, meets delay requirements of interactive real-time communication, and is resource efficient, such that it can run on a general purpose CPU, and requires little overhead information to be forwarded from node to node.

SUMMARY

In view of the above, an object of the present invention is to overcome or at least mitigate drawbacks of prior art video conferencing systems.

A first aspect the invention provides a method of training a speech detection and speech enhancement unit of a Multipoint Conferencing Node (MCN), comprising:

collecting, for each of a plurality of acoustic environments, a plurality of audio samples consisting of noise, clean speech and noisy speech;

labeling each of the plurality of samples with an acoustic environmental label corresponding to one of the plurality of acoustic environments;

labeling the plurality of audio samples consisting of clean speech with clean speech label;

extracting Time-Frequency (T-F) domain features from the plurality of audio samples consisting of noise, clean speech and noisy speech;

training, for each of the plurality of acoustic environments, one speech detection classifier by inputting the T-F domain features of the plurality of audio samples consisting of noise, clean speech and noisy speech, the acoustic environmental labels and the clean speech labels to a first deep neural network; and training, for each of the plurality of environments, one statistical generative model representing the probability distributions of the T-F domain features of noisy speech, by inputting the T-F domain features of the plurality of audio samples comprising clean speech, the T-F domain features of the plurality audio samples comprising noise and the plurality of audio samples comprising noisy speech.

Training the speech detection and speech enhancement unit separately for different of acoustic environments has several advantages. One advantage is that when the machine learning models that are optimized for the specific categories of acoustic environment, the machine learning models are smaller and require shorter time and resources to train. Another advantage is that trained machine learning model do not require large scale DNNs, hence greatly reduced computation footprint and resource utilization and makes the system possible to scale.

Another advantage of training the speech detection and speech enhancement unit separately for different of acoustic environments is that it can easily be extended to accommodate different acoustic environments of interest.

In one embodiment, the plurality of acoustic environments may comprise meeting room with video conferencing endpoint, home office, and public space.

In one embodiment, the statistical generative model may be a Gaussian Mixture Model.

A second aspect of the invention provides a method of speech detection and speech enhancement in a speech detection and speech enhancement unit of Multipoint Conferencing Node (MCN), comprising:

receiving input audio segments from at least one videoconferencing participants;

determining an acoustic environment based on auxiliary information of the at least one videoconferencing participant;

extracting Time-Frequency (T-F) domain features from the received input audio segments;

determining if each of the received input audio segments is speech by inputting the T-F domain features into a speech detection classifier trained for the determined acoustic environment;

determining, when one of the received input audio segments is speech, if the received audio segment is noisy speech by inputting the T-F domain features into a noise classifier using a statistical generative model representing the probability distributions of the T-F domain features of noisy speech trained for the determined acoustic environment; and applying a noise reduction mask on the received input audio segments according to the determination of the received audio segment is noisy speech.

In addition to the advantages mentioned above for the first aspect, and advantage of the second aspect is that noise is suppress but not eliminated, such that speech is more easily comprehensible, but the underlying acoustic background is not lost.

In one embodiment, the auxiliary information of the at least one videoconferencing participant may comprise at least one of a number of participants in a video image received from the at least one videoconferencing participant, and a specification of a videoconferencing endpoint received from the at least one videoconferencing participant. In one embodiment, the acoustic environment may comprise meeting room with video conferencing endpoint, home office, and public space.

In one embodiment, the speech detection and speech enhancement unit may be trained according the method of the first aspect.

In one embodiment, the noise classifier may be a Bayesian classifier.

In one embodiment, the noise reduction mask may be a composite noise reduction mask. In one embodiment the composite noise reduction mask may be based on an estimated binary mask (EBM) generated using the Bayesian classifier.

In one embodiment, the method of the second aspect may comprise updating the statistical generative model representing the probability distributions of the T-F domain features of noisy speech trained for the determined acoustic environment when the estimated probability of one the received input audio segments is noisy speech is close an estimated probability of the one received input audio segments is belonging clean speech.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

Figure 1:
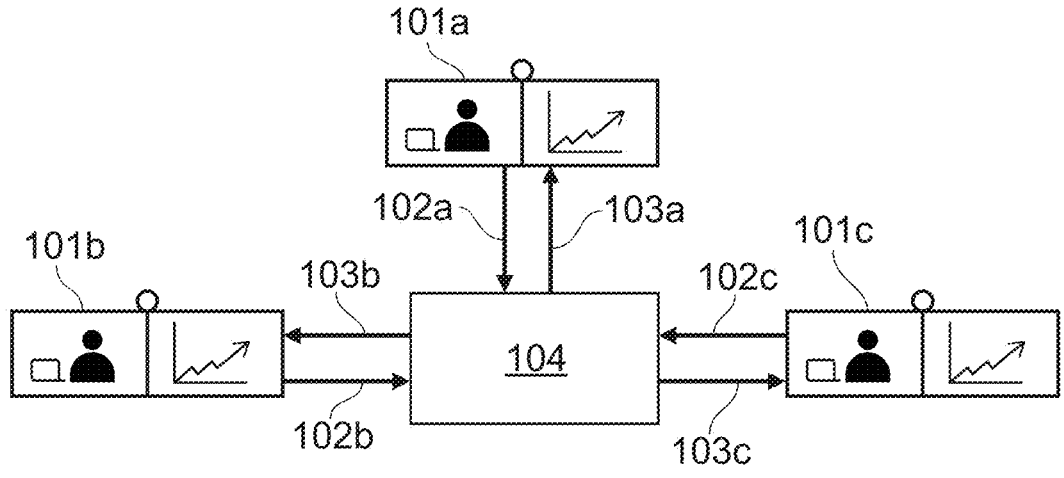
FIG. 1 is a schematic illustration of a multi-point videoconferencing system.

FIG. 1 schematically illustrates multi-point videoconferencing system 100 with three videoconferencing endpoints 101a, 101b, 101c in communication with a multipoint conferencing node (MCN) 104. In the multi-point videoconferencing system 100 all media passes through the MCN 104. Input audio 102a, 102b, 102c captured at the videoconferencing endpoints 101a, 101b, 101c is transmitted to the MCU 104, then the input audio 102a, 102b, 102c is mixed with audio from the other videoconferencing endpoints 101a, 101b, 101c, and output audio 103a, 103b, 103c is transmitted back out to the videoconferencing endpoints 101a, 101b, 101c.

Figure 2:
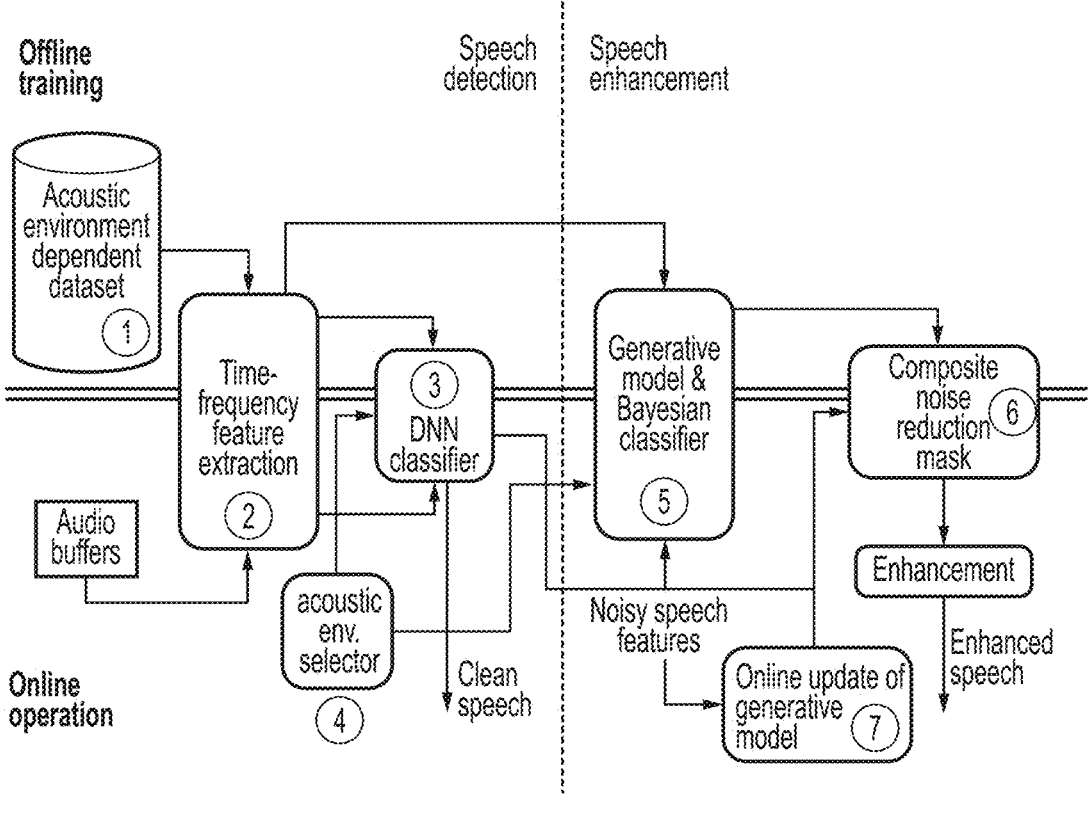
FIG. 2 is a flowchart illustrating an exemplary method of providing speech detection and speech enhancement in a multi-point videoconferencing system.

FIG. 2 is a flowchart illustrating an exemplary method of providing speech detection and speech enhancement in a multi-point videoconferencing system.

The first step of a method of training a speech detection and speech enhancement unit of a Multipoint Conferencing Node (MCN) is to provide an acoustic dependent dataset 1. In one embodiment it is collected, for each of a plurality of acoustic environments, a plurality of audio samples consisting of noise, clean speech and noisy speech. The plurality of acoustic environments may comprise three broad acoustic environment categories, such as meeting room with video conferencing endpoint, home office, and public space.

Within each category, the dataset consists of noise n(k), and clean speech x(k) and noisy speech z(k) samples, where k denotes the sampling instances in time. The noisy speech may be described by $z(k)=g(x(k),n(k))$. Depending on the specific acoustic environment class, the relationship function $g(\cdot)$ may be linear (e.g. additive) or nonlinear (in the case of reverberation). It is not required that $g(\cdot)$ is known. It is sufficient that each noisy speech has a known source of noise and speech it is generated from. The dataset is preferably made to capture main sources of noise and their relations to clean speech in a videoconferencing setting. The dataset should be sufficiently large to avoid overfitting of machine learning models. The dataset may preferably contain samples of different languages and utterances of people of various gender, age, and accents. The dataset may preferably contain common noise contributions from the considered acoustic environments.

There are several advantages of building an acoustic environment dependent dataset such as to reduce mismatch between training and testing data, such that resulting machine learning model deliver consistent results; to reduce the complexity of data pattern expected to be captured by the machine learning model, such that the resulting compact model does not run the risk of underfitting, while avoiding overfitting which is common for large DNN, and to facilitate online updates of models.

For the speech detection part of the system, each of the plurality of samples is labeled with an acoustic environmental label corresponding to one of the plurality of acoustic environments, such as meeting room with video conferencing endpoint, home office, and public space.

Each of the plurality of audio samples consisting of clean speech is labeled with clean speech label. The labels may be provided in the form of timestamps indicating when clean speech starts and stops.

The next step of the training method is to extract Time-Frequency (T-F) domain features 2 from the plurality of audio samples consisting of noise, clean speech and noisy speech.

Figure 3:
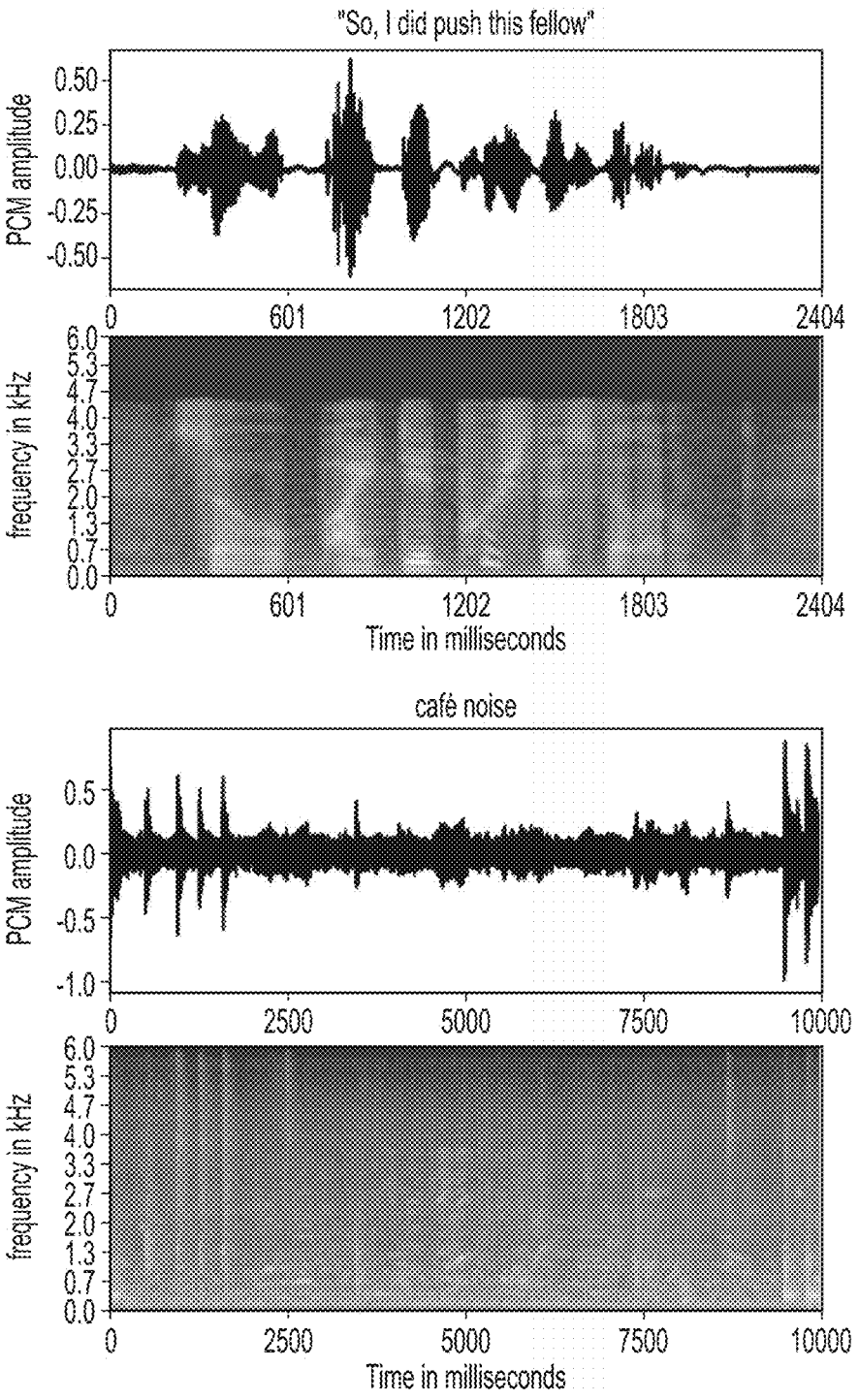
FIG. 3 is an exemplary illustration of Time-Frequency domain features of speech and noise.

Extracting features from a speech signal in the T-F domain may be performed by several possible methodologies known to the skilled person. Different choices of methodology will lead to different machine learning models and variations in performance. However, there is no specific feature extraction method that is optimal in all use case scenarios. One exemplary, commonly used feature extraction methods, which generates Mel frequency coefficients is described herein with reference to FIG. 3. Audio samples are packed into fixed frame sizes in milliseconds range (e.g. 10 ms). Short Time Fourier Transform is applied to the resulting audio frames in fixed batch size (e.g. 4) into the frequency domain, where there are overlapping between the frames (e.g. 50%). A windowing function (e.g. Hanning) is applied to minimize the edge effects between frames. 128 channel Mel filterbanks is applied and then Discrete Cosine Transform is applied. This results in n×M features where n is the number of frames processed in batch and M is the number of Mel-frequency cepstrum coefficient (MFCC).

The next step of the training method is training, for each of the plurality of acoustic environments, one speech detection classifier 3 by inputting the T-F domain features of the plurality of audio samples consisting of noise, clean speech and noisy speech, the acoustic environmental labels and the clean speech labels to a first deep neural network (DNN). That is, one classifier is trained per acoustic environment category, or its subcategories if needed. Weights of the trained classifier may be quantized to support for example 16 bits precision or lower. The trained DNN model typically contains an input layer, hidden layers and output layer.

The next step of the training method comprises training, for each of the plurality of environments, one statistical generative model 5 representing the probability distributions of the T-F domain features of noisy speech, by inputting the T-F domain features of the plurality of audio samples comprising clean speech, the T-F domain features of the plurality audio samples comprising noise and the plurality of audio samples comprising noisy speech. The statistical generative model may in one embodiment be a Gaussian Mixture Model (GMM).

The Ideal binary mask (IBM) is a known technique for noise suppression in speech. The binary mask must be estimated in practice, as the IBM is not known apriori. There have been various approaches in estimating the binary mask, both machine learning and non-machine learning based. A statistical generative model may be trained in the unsupervised manner to represent the probability distributions of the T-F features of noisy speech.

For each acoustic environment category, during offline training the T-F features of the acoustic training samples are divided into two classes, $Cl_s$, where speech is dominating, i.e. clean speech, and $Cl_n$, where noise is dominating, i.e. noisy speech. The division is according to a priori Signal-to-Noise (SNR) ratio, which is defined as: $SNR_{aprior}=|X(\tau,k)|^2/E[|N(\tau,k)|^2]$, where $X(\tau,k)$ is the T-F feature vectors of the clean speech signal, $N(\tau,k)$ is that of the noisy speech signal and $E[\cdot]$ is an expectations operator. For each class, a Gaussian Mixture Model (GMM) is trained to represent the distribution of the different feature vectors at each T-F instance, for the calculated $SNR_{aprior}$. The GMM may be initialized using K-means clustering and optimized using standard techniques such as Expectation Maximization as known to the skilled person.

Again, with reference to FIG. 2, online operation of the speech detection and speech enhancement unit of Multipoint Conferencing Node (MCN) will be described by the following method of speech detection and speech enhancement. The MCN receives input audio segments from at least one videoconferencing participant 101a, 101b, 101c. The MCN determines an acoustic environment 4 based on auxiliary information of the at least one videoconferencing participant. The auxiliary information of the at least one video-conferencing participant may comprise a number of participants in a video image received from the at least one videoconferencing participant, e.g. determined via face count by analyzing the video image. Home offices are typically limited to one participant, meeting rooms may have multiple faces counts, whereas public spaces can have multiple face counts but will not be identified as a meeting room. The auxiliary information of the at least one video-conferencing participant may also comprise a specification of a videoconferencing endpoint received from the at least one videoconferencing participant, such as identification of the type of videoconferencing endpoint, e.g. room system, desktop system, PC-client etc. The auxiliary information is preferably not stored, nor may it be used to identify specific participants.

The next step of online operation of the speech detection and speech enhancement unit is to extract Time-Frequency (T-F) domain features 2 from the received input audio segments. This is may be done as described above with reference to the methodology of training the system. The next step is to input the extracted T-F domain features into a speech detection classifier 3 trained for the determined acoustic environment to determine if each of the received input audio segments is speech.

Once determined that one of the received input audio segments is speech, it is determined if the received audio segment is noisy speech by inputting the T-F domain features into a noise classifier 5 using a statistical generative model representing the probability distributions of the T-F domain features of noisy speech trained for the determined acoustic environment.

Then a noise reduction mask 6 is applied on the received input audio segments according to the determination of the received audio segment is noisy speech, whereby enhanced speech is obtained in the audio segments.

In one exemplary embodiment, the noise classifier is a Bayesian classifier $$P(Cl_s|Z(\tau,k))=\gamma P(Cl_s)P(Z(\tau,k)|Cl_s)$$

Where $P(Cl_s|Z(\tau,k))$ is the a posteriori probability of the noisy speech feature vectors $Z(\tau,k)$ belong to the speech dominant class $Cl_s$, $P(Z(\tau,k)|Cl_s)$ is the corresponding a priori probability, $P(Cl_s)$ is the probability of the feature vectors of the class and $\gamma$ denotes the constant offset, i.e. probability of features $Z(\tau,k)$. An a posteriori probability estimation is done for the noise dominant class $P(Cl_n|Z(\tau,k))$.

The noise reduction mask may in one embodiment be a composite noise reduction mask, in particular based on an estimated binary mask (EBM) generated using the Bayesian classifier.

Noise reduction based on spectral gain defined in terms of $SNR_{aprior}$ may effectively limit the musical noise (harmonic distortions), part of the speech harmonics might also be lost in the process. Hard decision noise mask such as Ideal binary mask (IBM) suffers from this effect. The Ideal ratio mask on the other hand is a soft decision mask which is made by applying the energy ratio between the target clean speech and the received noisy speech. Since it is based on a posteriori SNR (received noisy speech), it has the drawback of inducing harmonic distortions and can result in ringing sound which is undesirable. On the other hand, less removal of noise can be used for retaining the acoustic context. Combination of the two masks may therefore be used to achieve better balance between noise reduction and speech enhancement.

An estimated binary mask (EBM) is generated using the Bayesian classifier outcome as discussed above:

$$EBM(r,k) = \begin{cases} 1 & \text{if } P(Cl_x \mid Z(r,k)) > P(Cl_n \mid Z(r,k)) \\ 0 & \text{otherwise} \end{cases}$$

The estimated ratio mask (ERM) is defined as $ERM=|\hat{X}(\tau,k)|^2/|Z(\tau,k)|^2$, and $|\hat{X}(\tau,k)|^2$ is the estimated clean speech power. The ERM can be determined as follows:

a) using a decision direct approach, which indicates that the a priori SNR of the current frame follows the closely the previous frame's a posteriori SNR, $SNR_{aposte}=|Z(\tau,k-1)|^2/E[|N(\tau,k-1)|^2]$ b) ERM is then the ratio of the current frame's $\hat{SNR}_{aprio}$ and $SNR_{aposte}$ The composite noise reduction mask (CM) is then:

$$CM(\tau,k)=\alpha ERM(\tau,k)+\beta EBM(\tau,k)$$

where the weights $\alpha$ and $\beta$ are tuned for each of the acoustic environment class. In general, it is expected the ERM contribution to be considerably smaller than EBM, as some noise contribution is expected to retain to provide the acoustic context.

The estimated CM is applied to each T-F region of the noisy speech spectrum, summing the components from the different filter bands and inverse Fourier transform is then applied to construct the resulting enhanced speech signal.

Figure 4:
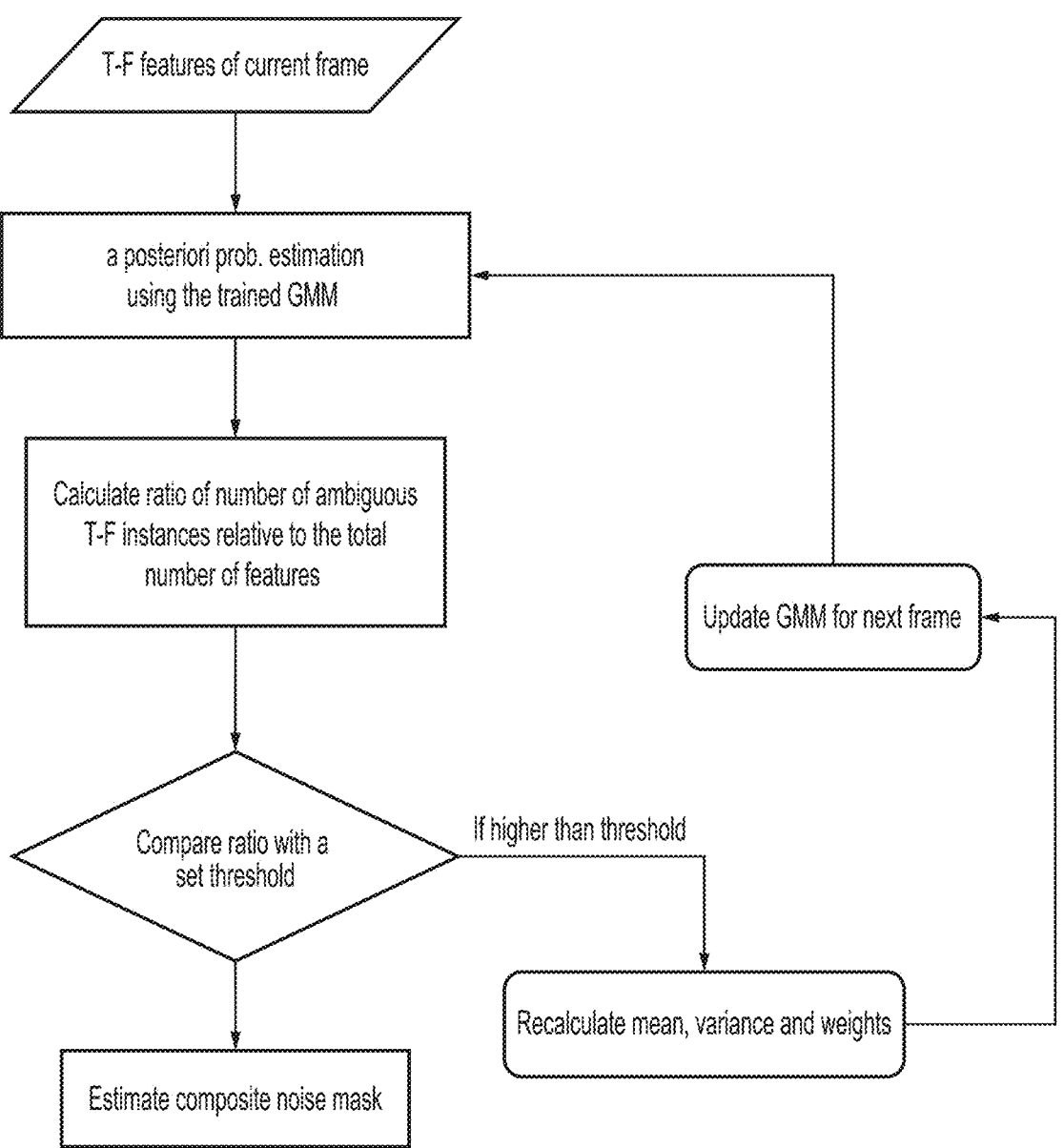
FIG. 4 is an exemplary flowchart illustrating an exemplary embodiment of the present invention.

In one embodiment, as illustrated with FIG. 4, during online operations the method may further comprise updating 7 the statistical generative model representing the probability distributions of the T-F domain features of noisy speech trained for the determined acoustic environment when the estimated probability of one the received input audio segments is noisy speech is close an estimated probability of the one received input audio segments is belonging clean speech. In particular, new data can be included in the trained GMM to provide better confidence in the EBM estimation. New weights of the model can be estimated using the same EM algorithm for training the GMM offline, along with new means and variance for the mixture. Constraints may be applied to ensure convergence of the EM algorithm.

In the method illustrated in FIG. 4, T-F features of the current audio frame is extracted. Then a posteriori probability estimation is performed using the trained GMM. The ratio of the number of ambiguous T-F instances relative to the total number of T-F features is calculated. Then the calculated ratio is compared with a threshold. If the ratio is below the threshold, then the composite noise mask is calculated. If the calculated ratio is above the threshold, then the mean, variance and weights are recalculated, and the used to update the GMM for the next audio frame.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present invention.

What is claimed is:

1. A method of speech detection and speech enhancement in a speech detection and speech enhancement unit of Multipoint Conferencing Node (MCN), comprising:

receiving input audio segments from at least one video-conferencing participant;

determining an acoustic environment based on auxiliary information of the at least one videoconferencing participant, wherein determining an acoustic environment based on auxiliary information comprises: analyzing a video image to count a number of participants, and identifying a type of videoconferencing endpoint, wherein the acoustic environment is determined prior to processing the input audio segments;

extracting Time-Frequency (T-F) domain features from the received input audio segments;

determining if each of the received input audio segments is speech by inputting the T-F domain features into a speech detection classifier trained for the determined acoustic environment;

determining, when one of the received input audio segments is speech, if the received audio segment is noisy speech by inputting the T-F domain features into a noise classifier using a statistical generative model representing the probability distributions of the T-F domain features of noisy speech trained for the determined acoustic environment; and applying a noise reduction mask on the received input audio segments according to the determination of the received audio segment is noisy speech, wherein applying a noise reduction mask comprises applying a composite noise reduction mask calculated as CM(τ,k)= αERM(τ,k)+βEBM(τ,k), where ERM is an estimated ratio mask, EBM is an estimated binary mask generated using a Bayesian classifier, and α and β are weights tuned for the determined acoustic environment, wherein the auxiliary information of the at least one videoconferencing participant comprises at least one of a number of participants in a video image received from the at least one videoconferencing participant, and a specification of a videoconferencing endpoint received from the at least one videoconferencing participant, and wherein the acoustic environment comprises meeting room with video conferencing endpoint, home office, and public space.

2. The method of claim 1, wherein the speech detection and speech enhancement unit is trained according the method of claim 1.

3. The method of claim 1, wherein the noise classifier is a Bayesian classifier.

4. The method of claim 1, wherein the noise reduction mask is a composite noise reduction mask.

5. The method of claim 4, wherein the composite noise reduction mask is based on an estimated binary mask (EBM) generated using the Bayesian classifier.

* * * * *